United States Patent [19]

Nagata

[11] Patent Number: 5,374,198
[45] Date of Patent: Dec. 20, 1994

[54] IC CARD CONNECTOR

[75] Inventor: Syouichi Nagata, Tokyo, Japan

[73] Assignee: Nippon Steel Corporation, Tokyo, Japan

[21] Appl. No.: 136,611

[22] Filed: Oct. 15, 1993

Related U.S. Application Data

[63] Continuation of Ser. No. 933,181, Aug. 21, 1992, abandoned.

[30] Foreign Application Priority Data

Aug. 23, 1991 [JP] Japan .................. 3-238633

[51] Int. Cl.⁵ .......................................... H01R 13/62
[52] U.S. Cl. .................................... 439/157; 439/153
[58] Field of Search .......................... 439/152–160, 439/326–329, 630–637

[56] References Cited

U.S. PATENT DOCUMENTS

| | | | |
|---|---|---|---|
| 4,952,161 | 8/1990 | Komatsu | 439/159 |
| 5,026,296 | 6/1991 | Hashiguchi | 439/159 |
| 5,051,101 | 9/1991 | Komatsu | 439/159 |
| 5,145,389 | 9/1992 | Okubo | 439/159 |
| 5,152,697 | 10/1992 | Abe et al. | 439/152 |

FOREIGN PATENT DOCUMENTS

| | | |
|---|---|---|
| 0385750 | 2/1990 | European Pat. Off. . |
| 3224765 | 10/1991 | Japan . |
| 2205000 | 5/1988 | United Kingdom . |

OTHER PUBLICATIONS

Component Product Information Aviation Electronic No. 004, Oct. 1988.

*Primary Examiner*—David L. Pirlot
*Attorney, Agent, or Firm*—Pollock, Vande Sande & Priddy

[57] ABSTRACT

An IC card connector includes a body having a base and two parallel spaced apart legs projecting from both lateral ends of the base. The base and first portions of the two legs form a U-shaped holder for holding an IC card. The body is so shaped and dimensioned that it can be entirely accommodated in a thin plate-like space interposed between two opposite planes, coinciding substantially with the outer surfaces of the body and to provide a gap at second portions of the legs between the base and one of the two planes. Guiding members are formed in the legs first portions to guide loading of the IC card into the holder and pin electrodes are provided in the base for electrical connection to receiving terminals of the loaded IC card. A separating mechanism includes a sliding member supported in grooves formed in the second portions of the legs and slidably moveable between an initial and final position. The sliding member is engaged with the IC card loaded in the holder, when the sliding member is moved from the initial position, to move the IC card into a position where at least the receiving terminals are separated from the pin terminals. The sliding member is disposed in the gap between the base and one of the opposite planes and is accommodated within the thin plate-like space.

6 Claims, 5 Drawing Sheets

IC CARD CONNECTOR

This application is a continuation of Ser. No. 07/933,181 filed on Aug. 21, 1992 now abandoned.

BACKGROUND OF THE INVENTION

1. Field of the Invention

The present invention relates to an IC card connector, and more particularly, to an IC card connector mounted in a small processing unit such as a note-type personal computer and a small word processor using an IC card as an external storage device, and used to load the IC card into the processing unit and electrically connect the IC card to the processing unit.

2. Description of the Related Art

Recently, there are many small processing units such as note-type personal computers and small word processors which use the IC card as an external storage device in addition to, or instead of a floppy disk device in order to make the processing unit small. The small processing unit employing the IC card is provided with an IC card connector as described in, for example, "Component Product Information, Aviation Electronic", No. 004, published by Japan Aviation Electronic Industry on October, 1988.

A conventional IC card connector includes a body having a guide along which the IC card is loaded or inserted into the body and a slide plate mounted slidably on an upper surface or a lower surface of the body. The body is provided with many terminal electrodes called as pins for electrically connecting the IC card to the processing unit. On the other hand, the IC card includes receiving terminals with which the pins of the IC card connector are engaged when the IC card is inserted into the IC card connector.

When an operator uses the IC card, the operator inserts the IC card into the body of the IC card connector slidingly along the guide of the body and advances the IC card until the pins are inserted into the receiving terminals to load or connect the IC card to the IC card connector. When the IC card is to be taken out, the operator presses a push button for ejection. Thus, the slide plate is moved by a predetermined stroke and the IC card engaged with the slide plate is moved away from the body, so that the pins are entirely separated from the receiving terminals of the IC card. Accordingly, the operator can easily pull out the IC card from the IC card connector. In this manner, the IC card connector can be employed to easily insert and remove the IC card easily easily without damage of any of the many pins.

It is desirable to make the small processing unit such as the note-type personal computer thinner for convenience in carrying, and accordingly the research and development for making various elements thinner thereof are made. Hence, it is important that the IC card connector which is one of the elements of the small processing unit, be made thinner.

SUMMARY OF THE INVENTION

It is an object of the present invention to provide an IC card connector to be mounted in a small processing unit such as a note-type personal computer or a small word processor using an IC card as an external storage device and used to load the IC card into the processing unit and electrically connect the IC card to the processing unit, which is thinner than a conventional IC card connector.

In order to achieve this object, the IC card connector of the present invention comprises a body including a base and two parallel and spaced legs extending from both lateral edges of the base and each having first and second portions such that the base and the first portions of the two legs provide a U-shaped holder for holding an IC card. The body is shaped as a whole to be accommodated in a thin plate-like space interposed between two opposite planes and formed with a gap between the base and one of the two opposite planes. The connector further comprises guide means formed in the first portions of the legs to guide the IC card to be loaded to the holder, pin electrodes provided in the base to be electrically connected to receiving terminals of the loaded IC card, and separating means including a sliding member supported in grooves formed in the second portions of the legs and slidingly movable between an initial position and a final position and engaged with the IC card loaded in the holder, when the sliding member is moved from the initial position to the final position, to move the IC card to a position where at least the receiving terminals are separated from the pin terminals, whereby the sliding member is disposed in the gap between the base and one of the two opposite planes.

In the IC card connector of the present invention, the body is shaped as a whole to be accommodated in a thin plate-like space interposed between two opposite planes and the sliding member is mounted to the base to be accommodated in the plate-like space. Therefore, the whole thickness of the IC card connector of the present invention can be made thinner, by at least a distance corresponding to a thickness of the sliding member, than that of a conventional IC card connector having a sliding member mounted to the outside of the body.

DESCRIPTION OF THE PREFERRED EMBODIMENTS

One embodiment of the present invention will be described with reference to FIGS. 1 to 5. In the description, the terms "upper surface", "lower surface", "front end" and "rear end" are used to indicate the front side surface, reverse side surface, left end and right end of the IC card connector, respectively, as viewed in FIG. 1, unless otherwise specified.

Figure 2:
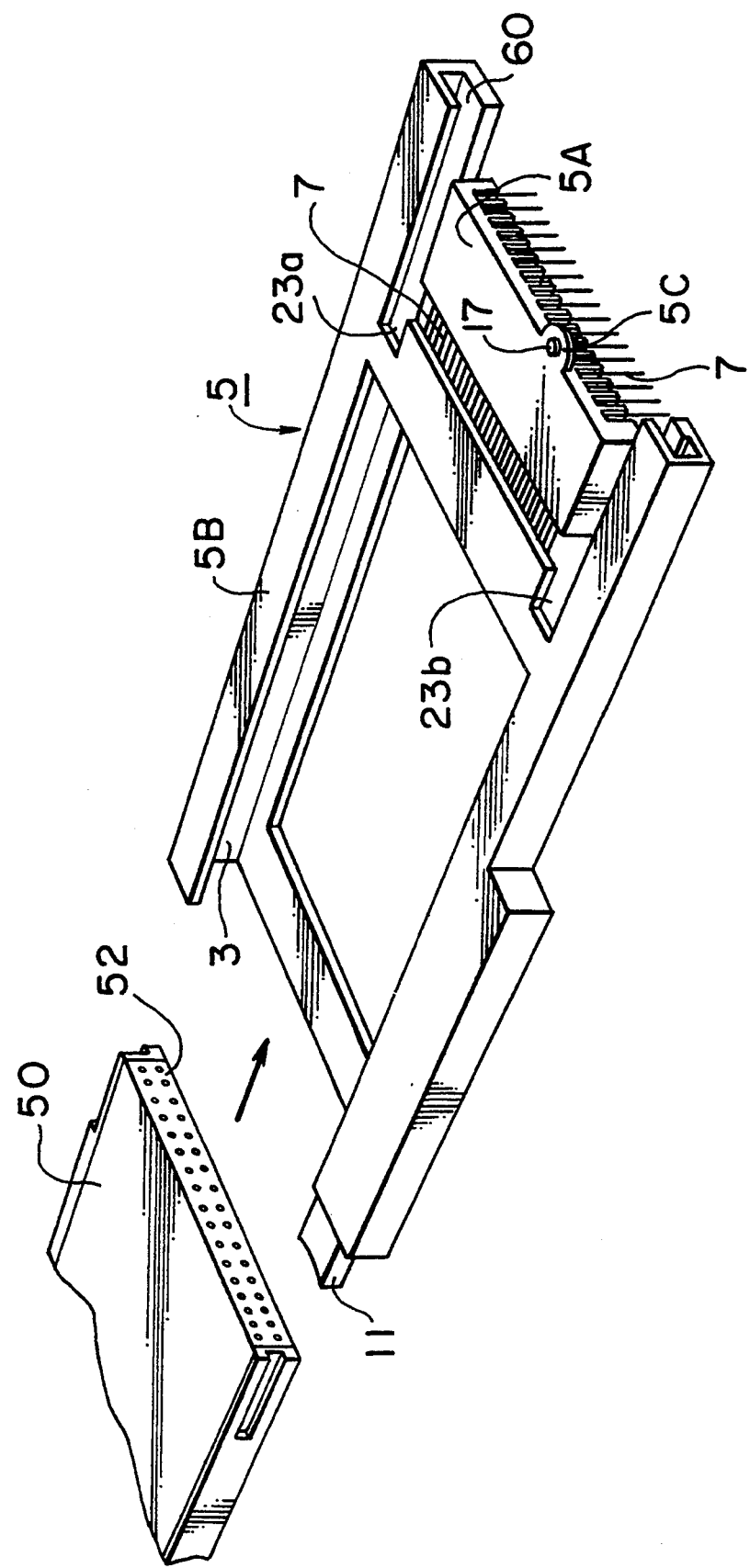
FIG. 2 is a perspective view showing a shape of a body of the IC card connector of FIG. 1.

The IC card connector of the embodiment includes a body 5 having a base 5A and two legs 5B extending from both lateral edges of the base 5A, parallel to each other with a space formed therebetween. As shown in FIG. 2, the base 5A and the front portions of the two legs 5B define a U-shaped holder for holding a mounted IC card 50. The front portions of the two legs 5B adjacent to the holder are formed with grooved guides 3 for guiding the IC card 50 into the holder. Pinhole-like receiving terminals 52 are formed in a rear end of the IC card 50. Embedded into the base 5A are a number of electrode terminals 7 called as pins for electrically connecting the IC card inserted into the IC card connector with a processing unit (not shown) to which the IC card connector is mounted. Respective ends of the pins extend forwardly from the base 5A to be inserted into the receiving terminals of the IC card as inserted into the IC card connector and the other ends of the pins extend downward from the base 5A to be inserted into receiving terminals provided in the processing unit. Grooves 60 for slidably supporting a slide plate, to be described later, are formed in the rear portions of the two legs 5B adjacent to the base 5A.

Figure 3:
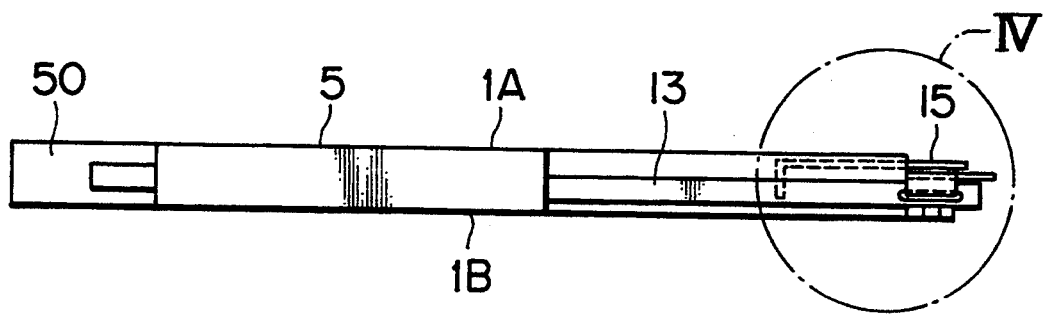
FIG. 3 is a side view of the IC card connector of FIG. 1 as viewed from a lower side of FIG. 1.
Figure 4:
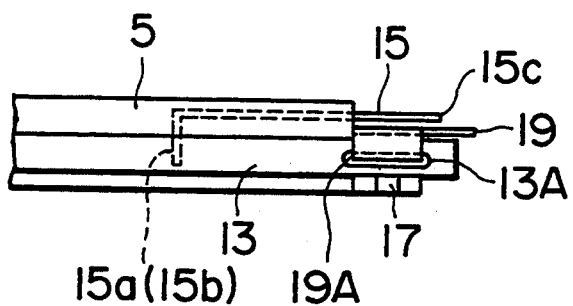
FIG. 4 is an enlarged view of a portion IV of FIG. 3.
Figure 5:
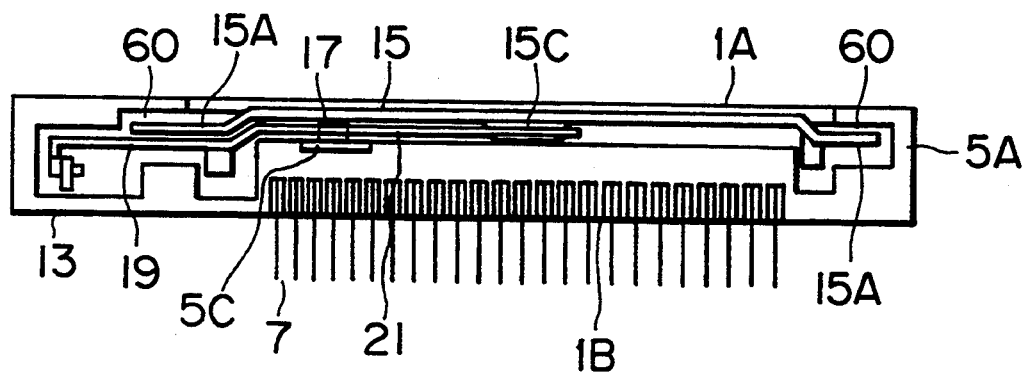
FIG. 5 is a side view of the IC card connector of FIG. 1 as viewed from a right side of FIG. 1.

An ejection mechanism 9 for removing the IC card 50 from the holder includes a push button 11, an ejection bar 13 coupled with the push button 11 and extending along one of the legs 5B, operation arms 19 and 21 and a slide plate 15. The push button 11 is normally urged to be moved forwardly (the left direction) by means of a spring 25. As shown in FIG. 4, a hole 13A is formed in one end of the ejection bar 13 and a bent portion 19A formed at one end of the operation arm 19 is engaged with the hole 13A so that the ejection bar 13 interlocks with the operation arm 19. As shown in FIG. 5, the slide plate 15 includes both lateral ends formed stepwise so that both of the lateral ends are positioned slightly lower than its central portion. Both of the lateral ends are slidably supported in grooves 60 formed in the legs 5B and the slide plate 15 can be moved between an initial position shown by solid line and a final position shown by an one-dot-chain line in FIG. 1. Further, the slide plate 15 includes claws 15a and 15b extending forwardly from both ends thereof. As shown in FIG. 3, the claws 15a and 15b include ends which are bent and extend downward through notches 23a and 23b, each being formed in an extension of the gap between the base 5A and each of the two legs 5B to form an engagement portion for engaging with a rear end of the IC card 50 inserted into the holder of the base 5A. The operation arm 19 is pivotally supported by a pivot means having an axis 17 extending upward from a tab 5C projecting from the rear end of the base 5A. The operation arm 21 is formed integrally with the operation arm 19 and can be rotated (pivoted) about the axis 17 together with the operation arm 19. A central portion of the rear end of the slide plate 15 is bent downward to form a bent portion 15c, which is engaged with an end of the operation arm 21. Thus, when the push button 11 is pressed backward (the direction shown by arrow A), the ejection bar 13 is moved backward along the leg 5B, so that the operation arms 19 and 21 are rotated about the axis 17 counterclockwise. The slide plate 15 engaged with the operation arm 21 is moved forward (the direction shown by arrow B) from the initial position to the final position and the claws 15a and 15b abut against the front end of the IC card 50 to move the IC card 50 forward.

When the IC card 50 is used, both the lateral edges of the IC card are inserted into the guides 3 of the legs 5B and the IC card 50 is advanced until the pins 7 are inserted into the receiving terminals 52 formed in the rear end of the IC card 50, so that the IC card 50 is inserted or loaded in the holder of the IC card connector. At this time, since the claws 15a and 15b of the slide plate 15 are pushed by the IC card 50, the slide plate 15 is moved to the initial position, while the claws 15a and 15b abut against the rear end of the IC card 50.

When the IC card 50 is to be taken out, the operator pushes the push button 11 in the direction shown by arrow A against the resilient force of the spring 25. Consequently, the ejection bar 13, the operation arms 19 and 21 and the slide plate 15 are moved successively as described above and the claws 15a and 15b abut against the end of the IC card 50, so that the IC card is pushed out in the direction shown by arrow B. The length of a stroke of the slide plate from the initial position to the final position is sufficiently longer than a length of each of the pins 7. Accordingly, when the slide plate 15 is moved to the final position, the pins 7 are perfectly separated from the receiving terminals of the IC card 50, so that the front end of the IC card 50 is projected from the IC card connector. The operator can grasp the projected end of the IC card and pull it out forward, so that the IC card 50 can be taken out from the IC card connector 1 externally.

The IC card connector of the embodiment including the body 5 having the base 5A and the legs 5B, the slide plate 15, and the operation arms 19 and 21 together with the loaded IC card 50 (thickness is 3.3 to 5.0 mm) is shaped to be accommodated in a thin plate-like space (thickness is 7 to 8 mm) interposed between two opposite planes 1A and 1B except for the portions of the pins extending downward, as shown in FIGS. 3 and 5. More particularly, the lower surface of the base 5A is formed in the same plane as the plane 1B while the upper surface thereof is formed lower than the plane 1A, and the dimensions and the shapes of the respective elements are selected so that the slide plate 15 and the operation arms 19 and 21 are positioned in a space between the upper surface of the base 5A and the plane 1A. Since the portions of the pins 7 projected downward are not concerned with a space required to mount the IC card connector to the processing unit, the projected portions of the pins can be neglected when the dimensioning of mounting space of the IC card connector is to be dealt with. The IC card connector of the embodiment can be made thinner, by at least a thickness (0.5-0.8 mm) of the slide plate, than the conventional IC card connector having the slide plate disposed on the upper or lower side of the body.

Another embodiment of the present invention is now described with reference to FIGS. 6 and 7. The IC card connector 10 of this embodiment is different from the IC card connector 1 of the embodiment of FIG. 1 in the structure of a slide plate 31 and operation arms 41 and 43 and the engagement therebetween. Accordingly, in this embodiment of FIGS. 6 and 7, the same elements as those of the embodiment of FIG. 1 are designated by the same reference numerals and detailed description thereof is omitted.

Figure 8:
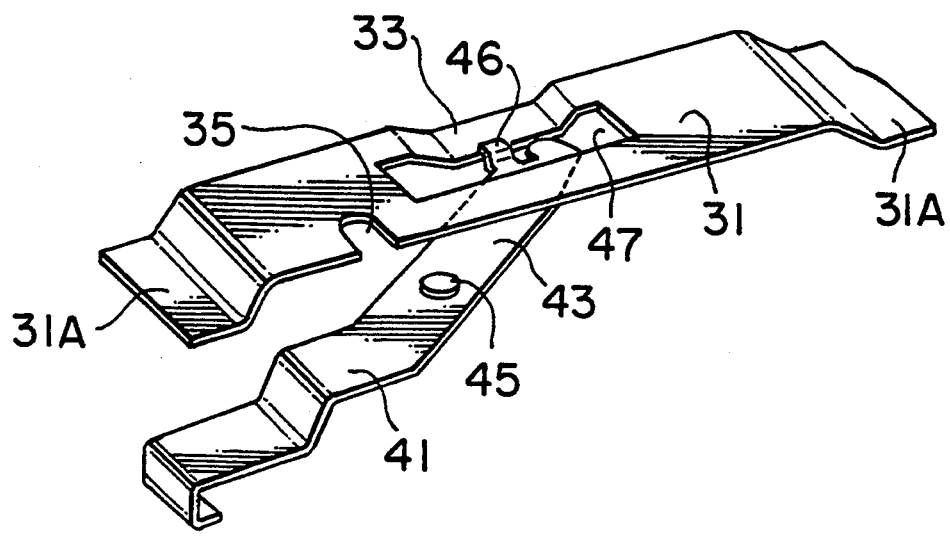
FIG. 8 is a perspective view showing a shape of a slide plate and an operation arm used in the IC card connector of another embodiment of the present invention.

The slide plate of this embodiment has the same shape as that of FIG. 8. As shown in FIG. 8, both ends of the slide plate 31 are formed stepwise to be lower than the central portion thereof in the same manner as in the embodiment of FIG. 1 and are supported slidably in grooves 60 formed in the legs 5B. Further, claws 31a and 31b which are to be engaging with the rear end of the IC card 50 are formed at both ends of the front edge (the left end portion) of the slide plate 31 to extend downward from the plate 31. A portion in the vicinity of the central portion of the front edge of the plate 31 is pressed down to form a recess 33. The bottom of the recess 33 is projected downward from the lower surface of the plate to be engaged with an end of the operation arm 43. The operation arms 41 and 43 are integrally formed and are supported rotatably about an axis 45 fixed to the base 5A, and extending upward. The depth of the recess is such that a length of a downwardly projected portion of the bottom of the recess is slightly longer than the thickness of the operation arms 41 and 43. An opening 47 of the plate 31 is formed in order to facilitate the forming of the recess 33 and a notch 35 is formed in order to prevent the upper end of the axis 45 from coming into contact with the plate 31 when the slide plate is at the initial position shown by one-dot chain line as shown in FIG. 6.

Figure 1:
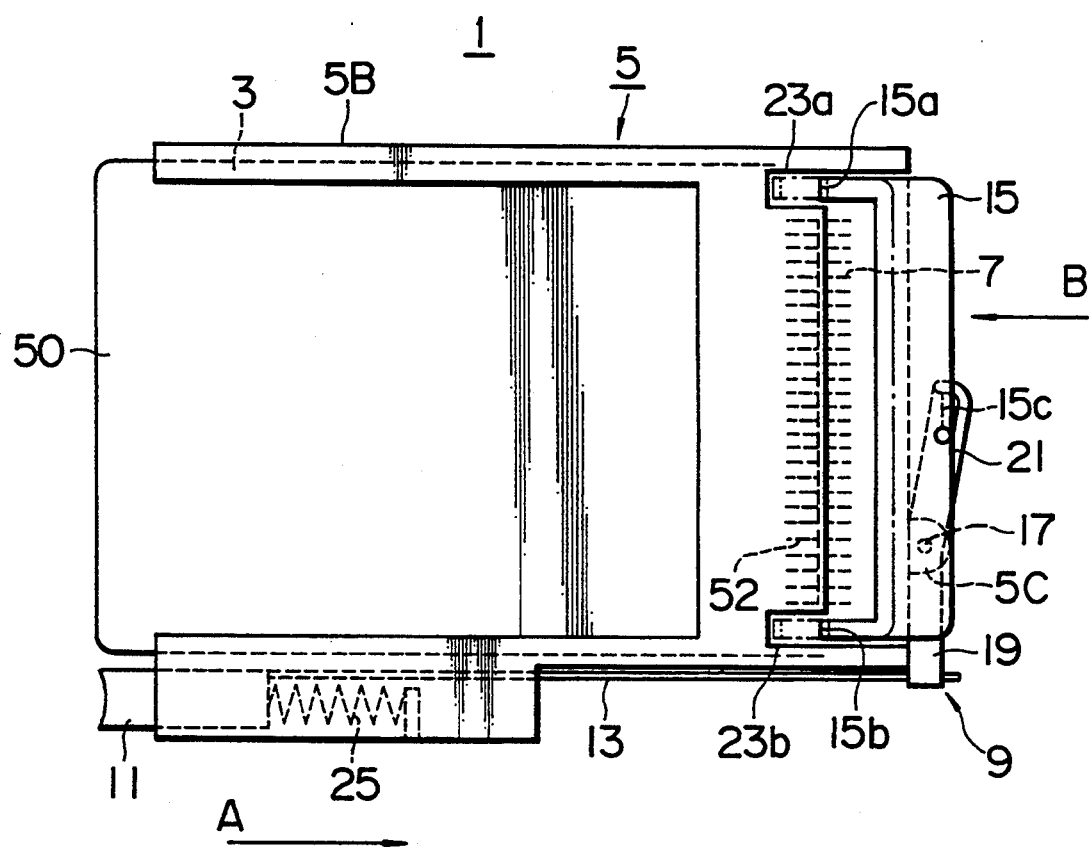
FIG. 1 is a plan view of an IC card connector according to an embodiment of the present invention.

In the embodiment, this IC card 50 is inserted or loaded in the holder of the IC card connector in the same manner as the embodiment of FIG. 1. At this time, the slide plate 31 is at the initial position shown by solid line in FIG. 6 and the operation arms 41 and 43 are at the position shown by dotted line. In order to take out the IC card 50, the operator pushes the push button 11 backward (the direction shown by arrow A of FIG. 6). Thus, the ejection bar 13 is moved backward, so that the operation arm 41 coupled with the ejection bar 13 and hence the operation arm 43 formed integrally with the operation arm 41 are rotated counterclockwise about the axis 45 to the position shown by one-dot chain line. The end of the operation arm 43 abuts against the recess 33 of the slide plate 31, so that the slide plate 31 is moved forward (the direction shown by arrow B) from the initial position to the final position shown by one-dot chain line. The claws 31a and 31b of the slide plate 31 abut against the rear end of the IC card 50 to move the IC card 50 forward. A length of a stroke of the slide plate from the initial position to the final position is sufficiently longer than a length of the pins 7. Accordingly, when the slide plate 31 is moved to the final position, the pins 7 are perfectly separated from the receiving terminals of the IC card 50 and the operator can easily take out the IC card 50 from the IC card connector 10 externally.

Figure 6:
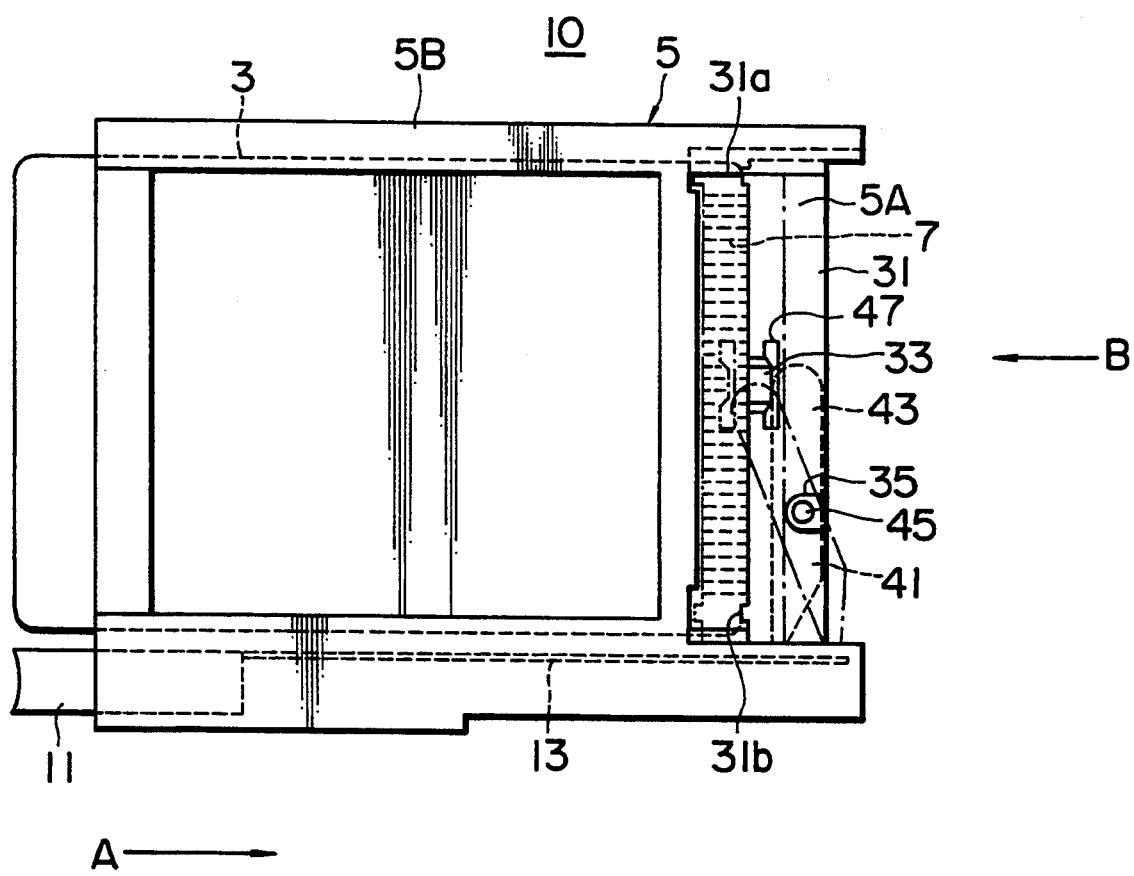
FIG. 6 is a plan view of an IC card connector according to another embodiment of the present invention.

In the embodiment of FIG. 6, since the slide plate 31 is prevented by the notch 35 formed in the slide plate 31 from coming into contact with the axis 45 when the slide plate 31 is moved between the initial position and the final position, the restrictions in mounting of the slide plate 31 to the base 5A are reduced as compared with the embodiment of FIG. 1 and hence the dimension of the whole structure can be made thinner.

Figure 7:
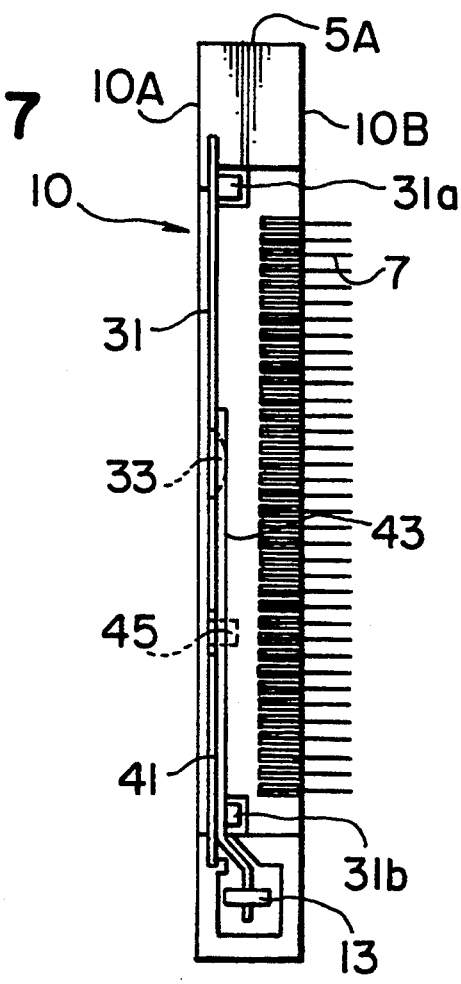
FIG. 7 is a side view of the IC card connector of FIG. 6 as viewed from a right side of FIG. 6.

In this embodiment, the IC card connector 10 including the body 5 having the base 5A and the legs 5B, the slide plate 31 and the operation arms 41 and 43 together with the loaded IC card 50 is shaped to be entirely accommodated in a thin plate-like space interposed between two opposite planes 10A and 10B as viewed from the side as shown in FIG. 7 in the same manner as the embodiment of FIG. 1. Further, as shown in FIG. 7, the pins 7 are partially projected downward for connection with an electrical circuit of the processing unit. As described above, however, since the projected portions of the pins are not concerned with a space required to mount the IC card connector to the processing unit, the projected portions of the pins can be neglected when the mounting space of the IC card connector is a problem to be solved. The IC card connector of the embodiment can be made thinner by at least a thickness of the slide plate than the conventional IC card connector having the slide plate disposed on the upper or lower side of the body.

A modification of the operation arm 43 used in the embodiment of FIG. 6 is shown in FIG. 8. Since the operation arm 43 of FIG. 8 is formed with a claw 46 which is engaged with the recess 33 of the slide plate, the engagement between the operation arm and the slide plate is made more securely as compared with the embodiment of FIG. 6.

I claim:

1. An IC card connector comprising:
   a body including a base and two parallel spaced apart legs projecting from both lateral ends of said base and each leg having first portion extending in a first direction from said base and a second portion extending from said base in a second direction opposite to said first direction, said base and the first portions of said two legs forming a U-shaped holder for holding an IC card at a front side in the first direction from said base, said body being so shaped and dimensioned as to be entirely accommodated in a thin plate-like space interposed between two opposite planes and coinciding substantially with the two opposite substantially planar outer surfaces of said body and to provide a thin gap at an upper side of said base between said base and one of said two opposite planes;
   guide means formed in the first portions of said legs to guide said IC card to be loaded into said holder;
   pin electrodes provided in said base to be electrically connected to receiving terminals of the loaded IC card; and
   separating means including a sliding member slidably supported in grooves formed in the second portions of the legs and engagable with said IC card loaded in said holder said sliding member being substantially confined longitudinally rearwards of said IC card, said separating means also including an operating arm movable between an initial position and a final position and operationally engaged with said sliding member such that when said sliding member is moved from said initial position to said final position said sliding member is engaged with said IC card loaded in said holder thereby moving said IC card to a position where at least said receiving terminals are separated from said pin terminals; wherein said sliding member is disposed in said thin gap provided at the upper side of said base so that said IC card connector is entirely accommodated in said thin plate-like space and wherein a forward portion of said sliding member engages forward portions of said IC card without longitudinally overlapping two major planar surfaces of said IC card.

2. An IC card connector according to claim 1, wherein said operation arm is mounted rotatably about a pivot member having an axis and fixed to said base and said sliding member is formed with a notch formed so as to prevent said sliding member from coming into contact with said pivot member when said sliding member is moved from said initial position to said final position.

3. An IC card connector comprising:
   a body including a base and two parallel and spaced apart legs extending from both lateral ends of said base and each leg having a first portion extending in a first direction from said base and a second portion extending in a second direction opposite to said first direction, said base and the first portions of said two legs forming a U-shaped holder for holding an IC card at a front side in the first direction of said base, said body being shaped and dimensioned so as to be entirely accommodated in a thin plate-like space interposed between two opposite planes substantially coinciding with the outer substantially planar surfaces of said body and to provide a thin gap disposed at an upper side of said base between said base and one of said two opposite planes;

guide means formed in the first portions of said legs to guide said IC card to be loaded into said holder;

terminal electrodes provided in said base to be electrically connected to receiving terminals of the loaded IC card; and ejecting means including a sliding member having opposite end portions formed step-like and slidably supported in grooves formed in the second portions of the legs, said sliding member being substantially confined longitudinally rearwards of said IC card, said separating means also including an operating arm movable between an initial position and a final position, said step-like portions of said sliding member being engagable with the IC card while loaded in said holder and said operating arm being operatively engaged with said sliding member such that when said operating arm is moved from said initial position to said final position, said step-like portions of said sliding member are engaged with said IC card loaded in said holder, thereby moving said IC card to a position where at least said receiving terminals are separated from said terminal electrodes, wherein said sliding member and said operating arm are accommodated in said thin gap provided at the upper side of said base between said base and the one of said two opposite planes and wherein said sliding member longitudinally does not overlap with the two major plane surfaces of said IC card.

4. An IC card connector according to claim 3, wherein said operation arm is mounted rotatably about a pivot member having an axis and fixed to said base and wherein said sliding member is formed with a notch for preventing contact with said pivot member when said sliding member is moved from said initial position to said final position.

5. An IC card connector comprising:

a body including a base and two parallel and spaced apart legs extending from both lateral ends of said base and each having a first portion extending in a first direction and a second portion extending in a second direction which is opposite to said first direction, said base and the first portion of said two legs forming a U-shaped holder for holding an IC card at a front side in the first direction of said base, said body being shaped and dimensioned to be entirely accommodated in a thin plate-like space interposed between two opposite planes and to provide a thin gap at an upper side of said base between said base and one of said two opposite planes;

guide means formed in the first portion of said legs to guide said IC card to be loaded into said holder;

terminal electrodes provided in said base to be electrically connected to receiving terminals of the loaded IC card; and ejecting means including a sliding member slidably supported in grooves formed in the second portions of the legs and an operating arm movable between an initial position and a final position, said sliding member being engagable with the IC card while loaded in said holder and said operating arm being operatively engaged with said sliding member such that when said operating arm is moved from said initial position to said final position, said sliding member is engaged with said IC card loaded in said holder thereby to move said IC card to a position where at least said receiving terminals of the IC card are separated from said terminal electrodes, wherein said sliding member and said operating arm are accommodated in said thin gap provided at the upper side of said base between the upper surface of said base and the one of said two opposite planes, and are confined substantially longitudinally rearwardly of said IC card without longitudinally overlapping with two major plane surfaces of said IC card.

6. An IC card connector according to claim 5, wherein said operation arm is mounted rotatably about a pivot member having an axis and fixed to said base and said sliding member is formed with a notch which prevents said sliding member from contacting said pivot member when said sliding member is moved from said initial position and to final position.

* * * * *